United States Patent

Abiru et al.

[11] Patent Number: 5,881,492
[45] Date of Patent: Mar. 16, 1999

[54] FISHING LINE

[75] Inventors: Shigeo Abiru; Hiroshi Yoshida, both of Osaka; Kazuhide Shirakawa; Masazumi Ando, both of Tokyo, all of Japan

[73] Assignees: Toyo Boseki Kabushiki Kaisha, Osaka; Shirakawa Co., Ltd., Tokyo, both of Japan

[21] Appl. No.: 679,659

[22] Filed: Jul. 12, 1996

[30] Foreign Application Priority Data

Jul. 14, 1995 [JP] Japan .................................. 7-179275

[51] Int. Cl.$^6$ .................................................. A01K 91/00
[52] U.S. Cl. ................................................................ 43/44.98
[58] Field of Search .................................. 43/44.98; 87/6, 87/9; 57/210, 224, 231, 230, 235

[56] References Cited

U.S. PATENT DOCUMENTS

| | | | |
|---|---|---|---|
| 831,108 | 9/1906 | Ryder | 57/210 |
| 1,078,333 | 11/1913 | Cole | 57/230 |
| 1,853,551 | 4/1932 | Crimmins et al. | 57/230 |
| 2,398,210 | 4/1946 | Cumming et al. | 87/6 |
| 4,470,251 | 9/1984 | Bettcher | 57/230 |
| 5,177,948 | 1/1993 | Kolmes et al. | 57/230 |
| 5,573,850 | 11/1996 | Cunningham et al. | 57/231 |
| 5,644,907 | 7/1997 | Kolmes et al. | 57/230 |

Primary Examiner—Michael J. Carone
Assistant Examiner—Darren Ark
Attorney, Agent, or Firm—Leydig, Voit & Mayer, Ltd.

[57] ABSTRACT

A fishing line comprising a wadding comprising a substantially paralleled multifilament yarn or multifilament yarn twisted so that the twist coefficient K of the formula $K=(T\sqrt{d})/73$ [$T$=count of twist ($t$/in), $d$=fineness (den)]

becomes not more than 0.5, and a multifilament sheath yarn wound around the periphery of the wadding, wherein the filament constituting said sheath yarn forms an angle of not more than 30° with the axis of the fishing line. The fishing line of the present invention is superior in mechanical properties such as strength at break, knot strength and elongation at break, and has a high abrasion resistance. According to the present invention, a resin coating does not fall off easily, and a long fishing line having superior productivity can be provided.

23 Claims, 3 Drawing Sheets

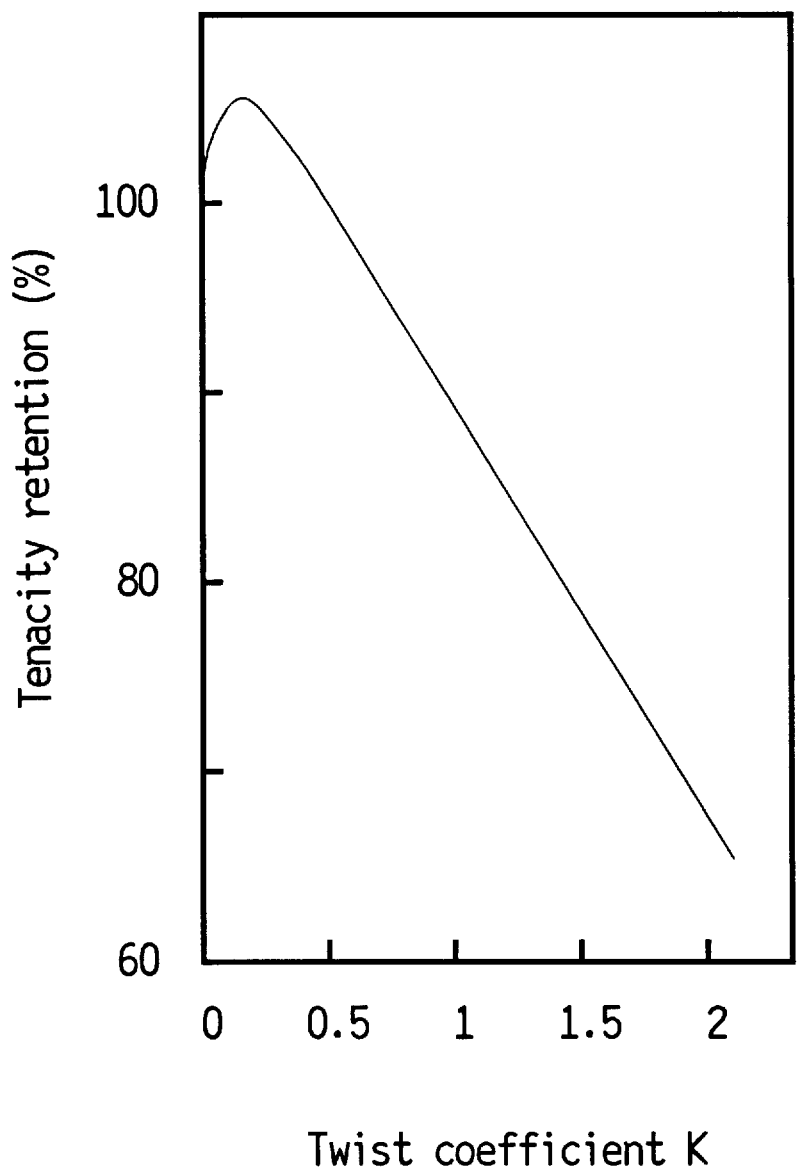

FISHING LINE

FIELD OF THE INVENTION

The present invention relates to a high quality fishing line widely used in fishery, leisure fishing and the like, which is required to have a high strength at break, a high knot strength, a low elongation at break, a high abrasion resistance and a superior durability.

BACKGROUND OF THE INVENTION

Fishing lines include, for example, a fishing line for reels which is used after winding around a reel, a fishing line for lure, a fishing line for fly, a fishing line for torrent fishing, a fishing line for sweetfish fishing, a decoy line and a leader line.

The properties commonly required for all these fishing lines to have are that they are light-weight and have high cord strength, as well as durability to maintain such properties for an extended period of time.

The majority of the fishing lines called fishing guts are generally made from nylon monofilaments. Along with the development of fibers called high cord strength fibers having a strength at break of 20 g/d or above, fishing lines made from such high cord strength fibers have been increasingly used particularly in deep-sea fishing, boat fishing and the like. These fishing lines are braids of 8 strands, 16 strands, and the like which have been coated with optional resins, wherein the fibers used are mostly made from ultra high molecular weight polyethylene alone.

In leisure fishing which is rapidly becoming popular in recent years, high quality but low price fishing lines have been desired. This is a consequence of growing recognition of the following practical problems associated with the conventional fishing lines which have a braid structure of 8 strands, 16 strands, and the like and which are made solely from a high cord strength fiber widely used for such use (typically Dyneema, trademark, manufactured by Toyo Boseki Kabushiki Kaisha).

(1) Braids suffer from low productivity (production rate is low and end breakage of even a single filament in optional number of necessary spoolings causes a great loss, thus greatly affecting the production efficiency), and low processing cost is difficult to achieve, which makes the price of fishing lines higher.

(2) Braids can be continuously manufactured only in the length permitted to be wound around a spool winder used for manufacturing braids, so that long fishing lines are difficult to make and only short fishing lines can be manufactured.

(3) Due to the braid structure, the fibers are substantially bent to an extreme degree for braiding. High cord strength fibers not in a straight line cannot exhibit mechanical properties to the fullest, such as high strength at break, high knot strength, low elongation at break and the like; in other words, cord strength utilization ratio is low. Specifically, for some high quality fishing lines made from a high cord strength fiber having a low elongation at break, fibers bent in use cause drastic fall of quality.

(4) For stabilization of shape and for superior feel during use, such as stiffness of a fishing line, to be achieved, the braiding angle needs to be increased (i.e., smaller braiding pitch), which ultimately causes low cord strength at break and high elongation at break, thus degrading mechanical properties.

(5) The constituent fibers have poor dyeability and fishing lines made therefrom cannot have various colors.

(6) The constituent fibers have poor adhesion. When a resin coating is applied, the resin tends to easily fall off to cause transfer of color when wound around a reel, thereby impairing appearance and staining fishing tackle and fisherman. In order to inhibit such release of the resin, an anchor effect of the resin is required, which is achieved by impregnating the voids between fibers with large amounts of resin and allowing the resin to solidify. As a result, the amount of the resin to be adhered cannot be decreased but increased to cause larger weight of the fishing line, which in turn makes the size of the fishing line bigger and strength at break per size number smaller, thus degrading the property of the fishing line.

(7) The service life of the fishing line is short, since the high cord strength fiber which controls the mechanical property of the fishing line is directly scraped by guides and the like.

(8) The degree of damage to the fishing line can be confirmed only by way of the damage to the high cord strength fiber itself which accompanies impairment of properties, and the damage tends to be found too late. In general, the means for estimating the service life of a fishing line is the observation of fussiness of the surface of the fishing line which is caused by abrasion damage to the surface. In the case of a braid structure, the breakage of or damage to the fiber itself which affects the cord strength at break of the fishing line corresponds to the assessment means. Therefore, when the breakage or damage is found, the cord strength at break has already decreased, and the degree of damage can be judged only after the cord strength at break has decreased.

It is therefore an object of the present invention to solve the above-noted problems and more effectively utilize the properties of the high cord strength fiber to be used for fishing lines, whereby to provide a fishing line having superior mechanical properties as compared to those of the conventional fishing lines, such as a high strength at break, a high knot strength and a low elongation at break, as well as a high abrasion resistance, a greater length, and superior productivity.

SUMMARY OF THE INVENTION

According to the present invention, there is now provided a fishing line prepared using, as a wadding, a substantially paralleled multifilament yarn or multifilament yarn twisted so that the twist coefficient K of the formula $$K=(T\sqrt{d})/73 \quad [T=\text{count of twist } (t/\text{in}), d=\text{fineness (den)}]$$

becomes not more than 0.5, wherein a multifilament sheath yarn is wound around the periphery of the wadding in such a manner that the filaments constituting the sheath yarn form an angle of not more than 30° with the axis of the fishing line.

The present invention also relates to the above-mentioned fishing line wherein a sheath yarn finer than the wadding is wound twice on the periphery of the wadding in the transverse winding directions. That is, the sheath yarn is wound in such a manner that, when the advancing direction of the spirally-wound inner yarn and outer yarn is assumed to be the same, the winding directions of these spirally-wound yarns are opposite to each other (hereinafter such relationship of winding directions is to be referred to briefly as opposite winding direction).

The present invention further relates to the above-mentioned fishing line wherein the outermost layer is coated with a resin, as well as the above-mentioned fishing line wherein the wadding and sheath yarn are heat melt bonded.

BRIEF EXPLANATION OF THE DRAWINGS

FIG. 3 is a graph showing the relationship between the twist coefficient and tenacity retention with regard to the ultra high molecular weight polyethylene fiber.

DETAILED DESCRIPTION OF THE INVENTION

Figure 1:
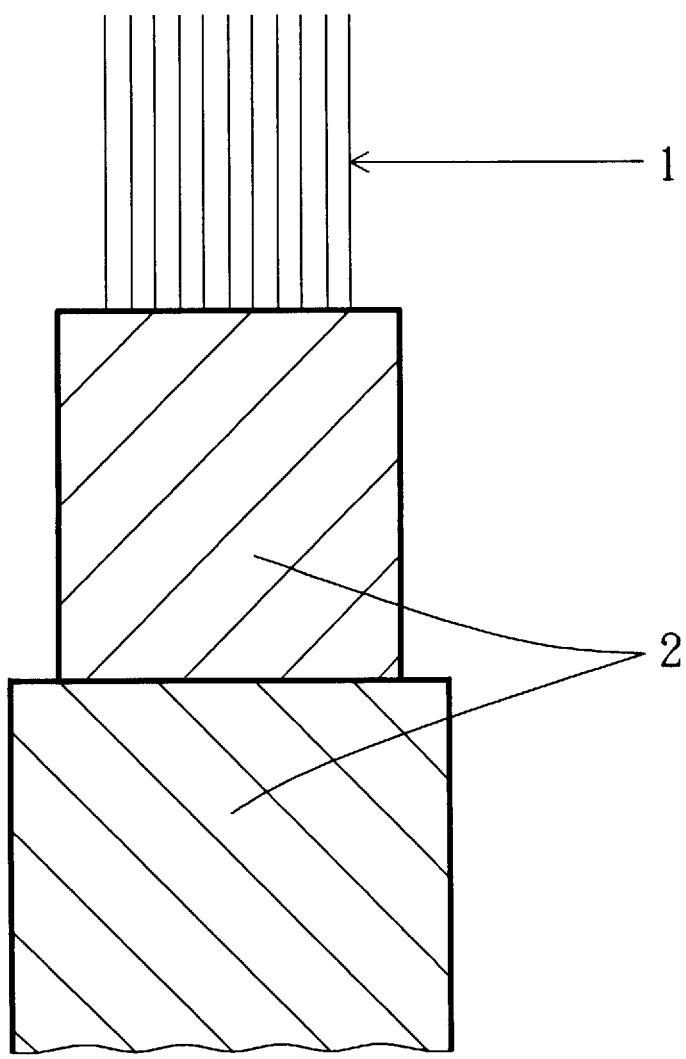
FIG. 1 shows one embodiment of the fishing line of the present invention.

The wadding to be used in the present invention needs to be a substantially paralleled multifilament yarn or multifilament yarn twisted so that the twist coefficient K of the formula $$K=(T\sqrt{d})/73 [T\text{=count of twist }(t/\text{in}), d\text{=fineness (den)}]$$

becomes not more than 0.5. That is, a multifilament yarn is used which is substantially paralleled relative to the axis of the fishing line or twisted low so that the twist coefficient K becomes not more than 0.5.

By "substantially" is meant that a raw yarn comes in parallel to the axis of the fishing line even without intentional control, when it is released from the bobbin at an angle of 90° with the axis of the bobbin.

By this way, the mechanical property of the fiber to be used for wadding can be utilized to the best possible extent; higher cord strength at break and higher knot cord strength than those of fishing lines having the same size but in conventional braid structures, can be achieved; and the elongation at break of the fishing line can be adjusted to the same value with the raw yarn. In consequence, a fishing line superior in total mechanical properties can be obtained.

When the coefficient K exceeds 0.5, the strength at break of the wadding tends to become smaller than the original strength at break of the fiber used. The twist coefficient K is preferably not more than 0.25.

This is also evident from the graph of FIG. 3. This graph shows the relationship between the twist coefficient of ultra high molecular weight polyethylene fiber (Dyneema) which is a high cord strength fiber, and the tenacity retention, wherein the axis of ordinates shows the tenacity retention [%, proportion of strength at break of ultra high molecular weight polyethylene fiber upon twisting to that of an untwisted one which is taken as 100%], and the axis of abscissa shows twist coefficient K.

In this formula, T and d are the values of a multifilament yarn.

The multifilament is twisted by a method not particularly limited, and the multifilament may be two-folded or three-folded. In view of the preferable complete round shape of the cross section of the filament for use for a fishing line, a single twist yarn is most preferable.

Further preference is given to a low twist yarn rather than an untwisted yarn.

While the material to be used for wadding is not particularly limited, preferred are high cord strength fibers such as ultra high molecular weight polyolefin fibers (e.g., ultra high molecular weight polyethylene, aramid fiber and polyarylate fiber), since the mechanical property of the wadding controls the mechanical property of the fishing line, and the fishing line is required to have certain mechanical properties. These fibers may be used alone or in combination.

It is also preferable to use, at least for part of the wadding and preferably in the entirety thereof, high cord strength fibers having a strength at break of not less than 20 g/d, an elongation at break of not more than 6%, and an initial modulus of not less than 600 g/d.

In consideration of durability such as sea water resistance, weatherabiliy (specifically, resistance to light), abrasion resistance and the like, the multifilament is preferably prepared from filaments formed by drawing, from among high cord strength fibers satisfying the above-mentioned mechanical properties, ultra high molecular weight polyolefine having a weight-average molecular weight of not less than 1,000,000, which is exemplified by Dyneema (trademark, manufactured by Toyo Boseki Kabushiki Kaisha).

In the present invention, it is required to wind a sheath yarn around the wadding in such a manner that the filament constituting the sheath yarn (hereinafter sometimes referred to as sheath yarn filaments) form an angle of not more than 30° with the axis of the fishing line.

By winding a sheath yarn around the periphery of the wadding in this way, the production rate can be made greater than that in the production of conventional braid fishing lines, which in turn results in marked decrease of production costs. In addition, production of long fishing lines can be attained.

When the sheath yarn filaments form an angle of not more than 30° with the axis of the fishing line when winding the sheath yarn around the periphery of the wadding, the friction resistance during frictional contact of the fishing line with guides formed on the fishing rod, reel and the like can be decreased to minimize frictional damages.

The above-mentioned structure enables separation of mechanical properties, such as high cord strength at break and low elongation at break, which are achieved by the wadding, and other properties, such as superior abrasion resistance and good appearance, which are handled by the sheath yarn. Consequently, fuzziness of the sheath yarn due to abrasion damages does not affect the wadding which provides the cord strength at break, whereby abrasion damages can be assessed before cord strength at break suffers from any decrease.

One embodiment of the fishing line of the present invention is shown in FIG. 1 wherein a sheath yarn is wound around the periphery of the wadding. This fishing line is covered twice as described later, and sheath yarn 2 is wound twice around the periphery of wadding 1 in the opposite winding directions.

Figure 2:
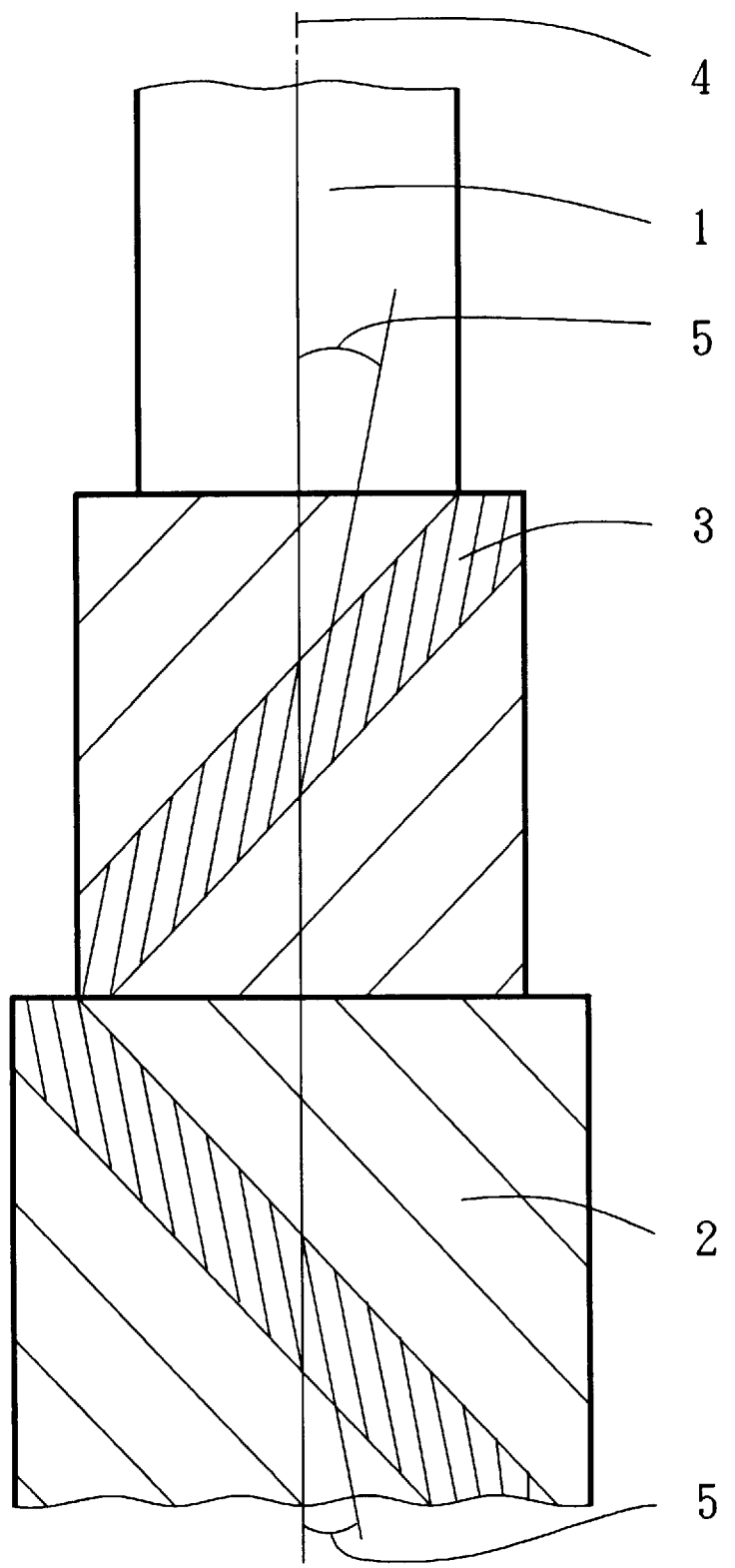
FIG. 2 is a partially enlarged view of the fishing line of FIG. 1.

The sheath yarn in FIG. 1 is mainly enlarged in FIG. 2, wherein filament 3 constituting the sheath yarn 2 forms an angle 5 with the axis 4 of the fishing line.

Each symbol used in the figures denotes the following. 1: wadding 2: sheath yarn 3: filament 4: axis of fishing line 5: angle of filament of sheath yarn with the axis of fishing line The angle formed by the sheath yarn filaments with the axis of the fishing line is preferably not more than 10°, more preferably near 0° to the greatest possible extent. When the angle exceeds 30°, the friction resistance of the fishing line becomes greater to cause poor abrasion resistance.

This angle can be adjusted, for example, by the manner of twisting the sheath yarn, winding the sheath yarn around the periphery of the wadding, and the like.

It is also preferable to wind a sheath yarn which is finer than the wadding on the periphery of the wadding twice (double covering) in the opposite winding directions. Such double covering in the opposite winding directions leads to the prevention of curling of the fishing line by offsetting the torque of each single winding.

When the periphery of the wadding is double-covered with a sheath yarn to produce a fishing line, a production rate of 7 times or more greater than braided fishing lines can be ensured.

Said sheath yarn is preferably finer than the wadding to balance the thickness of the fishing line and tensile cord strength. Preferred is the thickness of not more than 30% of the thickness of the wadding. That is, when the sheath yarn is wound around the periphery of the wadding for double-covering, a sheath yarn substantially having a fineness of not more than 60% of the fineness of the wadding forms the periphery.

The fineness of the wadding is preferably 10–10,000 deniers, and the fineness of the sheath yarn is preferably 1–3,000 deniers.

The material of the sheath yarn to be used in the present invention is not particularly limited. In view of an improved appearance by coloring, however, dyeable fibers for general clothing and industrial material are preferable, which permit dyeing with conventional dyes such as direct dye, vat dye, naphthol dye, sulphur dye, disperse dye, reactive dye, acid dye, complex salt dye and cationic dye.

Specific examples include natural fibers such as cotton, wool, animal hair, hemp and silk, and chemical fibers such as rayon, cuprammonium rayon, acetate, polyester fiber, polyamide (nylon) fiber, acrylic fiber, vinylon and polybutene fiber, with preference given to polyamide fiber and polybutene fiber. One or more suitable materials can be selected therefrom depending on the object of use.

The above-mentioned fibers can be dyed by a method conventionally known.

The fishing line of the present invention can be prepared, for example, by paralleling the wadding upon releasing a yarn at an angle of 90° with the axis of a bobbin, and winding a sheath yarn around the periphery of the wadding by a covering machine.

The fishing line of the present invention preferably has an outer layer finishing applied to the above-mentioned line by resin coating, heat bonding and the like.

Such adhesion or solidification of the outermost layer imparts, to the fishing line, superior stiffness, appearance and dimensional stability, which in turn improves handling property.

The resin to be used for this coating is not particularly limited, and may be, for example, urethane resin, acrylic resin, unsaturated polyester resin or epoxy resin.

The resin coating is formed, for example, by dipping the thus-obtained fishing line in a resin tank, squeezing off redundant resin with a nip roller and passing the line between non-contact type heaters to dry same with the radiant heat.

It is also possible to add a color material such as pigment (e.g., carbon black and malachite green) to the resin to freely control the color tone of the product. Therefore, a color code at certain intervals can be attained, which is called a shelfing marker and particularly required in deep sea fishing.

The amount of resin adhesion for resin coating is desirably made as small as possible. This is because an increased amount of adhered resin increases the weight of the fishing lines. Even if such finishing can be performed without degrading the mechanical property of the wadding, a noticeable increase in weight ultimately leads to smaller strength at break per size number, as well as degraded properties of the fishing line. The fishing line of the present invention can meet the properties that the fishing lines are required to have, with a less amount of resin adhesion than in conventional fishing lines which have a braid structure and are prepared from an ultra high molecular weight polyethylene fiber alone. The use of polyamide fibers such as nylon as the material for the sheath yarn is preferable in that the superior adhesion thereof to the above-mentioned resin affords desired stiffness with a slight amount of resin adhesion.

The heat melt adhesion can be performed by, for example, passing the fishing line between non-contact type heaters at a certain speed, thereby to heat-adhere the sheath to the wadding by radiant heat, and immediately immersing the line in a water bath for rapid cooling.

The heating temperature is generally 50°–135° C., preferably 50°–95° C., and heating time is generally 5 to 300 seconds, preferably 5 to 60 seconds.

In this case, the use of, for example, a fiber material (e.g., 12-nylon, polyethylene and polybutene) having a melting point which is 10° C. or more lower than the melting point of the wadding, as a sheath yarn, can accomplish heat melt adhesion of the sheath yarn to the wadding without degrading the property of the wadding by heating from outside.

The fishing line having an adhered and solidified outermost layer formed by the above-mentioned method can have desired appearance, shape, stiffness and the like which are requested besides the mechanical properties.

As described above, the fishing line of the present invention has been greatly improved in various properties, grades, production efficiency and cost as compared to the fishing lines having conventional braid structures, and has enabled easy production of long fishing lines. The fishing line of the present invention is well-balanced among these properties and can provide an excellent fishing line.

The present invention is described in more detail by the following Examples, to which the present invention is not limited.

EXAMPLE 1

Dyneema (weight-average molecular weight 2,000,000, fineness 1200 d, strength at break 32.0 g/d, elongation at break 3.9%, initial modulus 1,050 g/d) prepared from ultra high molecular weight polyethylene fiber was used as a wadding and 6-nylon (fineness 125 d) was used as a sheath yarn. The wadding was paralleled upon releasing a yarn at an angle of 90° with the axis of a bobbin, and the sheath yarn was double-covered on the periphery of the wadding by a covering machine wherein the angle of the filament with the axis of the fishing line was 3°. Then, an urethane resin added with carbon black was coated by dip dry method to give a fishing line.

EXAMPLES 2–5

Fishing lines were obtained in the same manner as in Example 1 under the conditions recited in Table 1.

In Example 2, an urethane resin added with carbon black was coated. In Examples 3–5, a sheath yarn dyed with an acid dye (black) was used.

Comparative Example 1

Using Dyneema (weight-average molecular weight 2,000,000, fineness 200 d, strength at break 32.0 g/d, elongation at break 3.9%, initial modulus 1,050 g/d) prepared from ultra high molecular weight polyethylene fiber as a raw yarn, a braid of 8 strands (braiding angle 12°) was prepared by a braiding machine. An urethane resin was coated by dip dry method to give a fishing line.

Comparative Examples 2, 3

Fishing lines were obtained in the same manner as in Comparative Example 1 under the conditions recited in Table 2.

In Comparative Examples 2 and 3, an urethane resin was coated.

Comparative Examples 4, 5

Fishing lines were obtained in the same manner as in Example 1 under the conditions recited in Table 3.

In Comparative Example 4, an urethane resin was coated.

The properties of the fishing lines obtained in the above Examples and Comparative Examples are shown in Tables 1–3. Each property was determined in the following manner.

The fineness was determined according to JIS L1013.7.3; cord strength at break, strength at break, elongation at break and initial modulus were determined according to JIS L1013.7.5; knot cord strength was determined according to JIS L1013.7.6; and twist coefficient was determined according to JIS L1013.7.11. The angle of the filaments of the sheath yarn with the axis of the fishing line, and braiding angle were measured on an enlarged picture of the fishing line. The indicated size number was converted based on 220 d≈No. 1. The abrasion resistance was determined according to JIS L1095.7.10 based on the retention of cord strength at break after undergoing a certain number of frictions. The productivity was evaluated on the basis of the production amount per unit time. The continuous length was the longest length of finishing in one process work. The stiffness was determined according to JIS L1096.6.19.1A, wherein ○ means fine, Δ means rather poor and X means failure. The falling off of the resin was determined according to JIS L1095.7.10 wherein the amount of the resin which fell off after a certain number of frictions was evaluated by ○: fine, Δ: rather poor and X: failure. The appearance was visually evaluated and expressed by ○: fine, Δ: rather poor and X: failure.

TABLE 1

| Evaluation item | Ex. 1 | Ex. 2 | Ex. 3 | Ex. 4 | Ex. 5 |
|---|---|---|---|---|---|
| wadding | Dyneema | Dyneema | Dyneema | Dyneema | Dyneema |
| fineness | 1,200 d | 800 d | 1,200 d | 800 d | 400 d |
| molecular weight *1 | 2000000 | 2000000 | 2000000 | 2000000 | 2000000 |
| strength at break | 32.0 g/d | 32.0 g/d | 32.0 g/d | 32.0 g/d | 32.0 g/d |
| elongation at break | 3.9% | 3.9% | 3.9% | 3.9% | 3.9% |
| elastic modulus *2 | 1,050 g/d | 1,050 g/d | 1,050 g/d | 1,050 g/d | 1,050 g/d |
| sheath yarn | 6-nylon | 6-nylon | 6-nylon | 12-nylon | 12-nylon |
| fineness | 125 d | 100 d | 125 d | 100 d | 125 d |
| structure | parallel | twist K = 0.2 | parallel | twist K = 0.2 | twist K = 0.2 |
| wadding sheath yarn | double covering | double covering | double covering | double covering | double covering |
| angle *3 | 3° | 5° | 3° | 5° | 8° |
| finishing | resin coating | resin coating | heat-melt bond *4 | heat-melt bond *4 | heat-melt bond *4 |
| coloring | carbon black | carbon black | acid dye | acid dye | acid dye |
| fineness | 1,731 d | 1,095 d | 1,731 d | 1,095 d | 776 d |
| indicated size No. | 8 | 5 | 8 | 5 | 3.5 |
| cord strength at break | 38.4 kg | 25.6 kg | 38.4 kg | 25.6 kg | 12.8 kg |
| strength at break | 22.2 g/d | 23.4 g/d | 22.2 g/d | 23.4 g/d | 16.5 g/d |
| elongation at break | 3.9% | 3.9% | 3.9% | 3.9% | 3.9% |
| knot cord strength | 16.8 kg | 11.0 kg. | 16.8 kg | 11.0 kg | 5.3 kg |
| abrasion resistance | 100% | 100% | 100% | 100% | 100% |
| productivity | 240 m/hr | 160 m/hr | 240 m/hr | 160 m/hr | 240 m/hr |
| continuous length | about 15000 m | about 22500 m | about 15000 m | about 22500 m | about 22500 m |
| stiffness | ○ | ○ | ○ | ○ | ○ |
| resin fall off | ○ | ○ | ○ | ○ | ○ |
| appearance | ○ | ○ | ○ | ○ | ○ |

*1: weight-average molecular weight
*2: initial modulus
*3: angle of filaments of sheath yarn with the axis of the fishing line
*4: heat-melt bonding conditions; preheating (80° C. × 30 sec) → heat treatment (100° C. × 30 sec) → rapid cooling (cooling in water × 30 sec), heating by radiant heat from non-contact type heaters

TABLE 2

| Evaluation item | Com. Ex. 1 | Com. Ex. 2 | Com. Ex. 3 |
|---|---|---|---|
| raw yarn | Dyneema | Dyneema | Dyneema |
| fineness | 200 d | 200 d | 200 d |
| molecular weight *1 | 2000,000 | 2000,000 | 2000,000 |
| strength at break | 32.0 g/d | 32.0 g/d | 32.0 g/d |
| elongation at break | 3.9% | 3.9% | 3.9% |
| elastic modulus *2 | 1,050 g/d | 1,050 g/d | 1,050 g/d |
| structure | 8 strand braid | 8 strand braid | 8 strand braid |
| braiding angle | 12° | 20° | 27° |
| finishing | resin coating | resin coating | resin coating |
| fineness | 1,701 d | 1,734 d | 1,764 d |
| indicated size No. | 8 | 8 | 8 |
| cord strength at break | 38.1 kg | 37.4 kg | 36.1 kg |
| strength at break | 22.4 g/d | 21.6 g/d | 20.5 g/d |
| elongation at break | 5.6% | 6.1% | 6.6% |
| knot cord strength | 14.9 kg | 13.8 kg | 12.9 kg |
| abrasion resistance | 74% | 71% | 65% |
| productivity | 34 m/hr | 28 m/hr | 24 m/hr |
| continuous length | about 2,950 m | about 2,800 m | about 2,700 m |
| stiffness | x | Δ | ○ |
| resin fall off | x | x | x |
| appearance | Δ | Δ | Δ |

*1: weight-average molecular weight
*2: initial modulus

TABLE 3

| Evaluation item | Com. Ex. 4 | Com. Ex. 5 |
|---|---|---|
| wadding | Dyneema | Dyneema |
| fineness | 1,200 d | 1,200 d |
| molecular weight *1 | 2000,000 | 2000,000 |
| strength at break | 32.0 g/d | 32.0 g/d |
| elongation at break | 3.9% | 3.9% |
| elastic modulus *2 | 1,050 g/d | 1,050 g/d |
| sheath yarn | 6-nylon | 12-nylon |
| fineness | 125 d | 125 d |
| structure wadding sheath yarn | parallel double covering | twist K = 0.2 double covering |
| braiding angle *3 | 35° | 40° |
| finishing | resin coating | heat-melt bond *4 |
| fineness | 1,701 d | 1,734 d |
| indicated size No. | 8 | 8 |

TABLE 3-continued

| Evaluation item | Com. Ex. 4 | Com. Ex. 5 |
| --- | --- | --- |
| cord strength at break | 38.4 kg | 38.4 kg |
| strength at break | 22.6 g/d | 22.1 g/d |
| elongation at break | 3.9% | 3.9% |
| knot cord strength | 16.8 kg | 16.8 kg |
| abrasion resistance | 85% | 79% |
| productivity | 240 m/hr | 240 m/hr |
| continuous length | about 15000 m | about 15000 m |
| stiffness | ○ | ○ |
| resin fall off | Δ | Δ |
| appearance | ○ | ○ |

*1: weight-average molecular weight
*2: initial modulus
*3: angle of filaments of sheath yarn with the axis of the fishing line
*4: heat-melt bonding conditions; preheating (80°C. × 30 sec) → heat treatment (100° C. × 30 sec) → rapid cooling (cooling in water × 30 sec), heating by radiant heat from non-contact type heaters The fishing line of the present invention is superior in mechanical properties such as strength at break, knot strength and elongation at break, and has a high abrasion resistance. According to the present invention, a resin coating does not fall off easily, and a long fishing line having superior productivity can be provided.

What is claimed is:

1. A fishing line comprising a wadding selected from the group consisting of a multifilament yarn which is optionally twisted so that the twist coefficient K of the formula $$K=(T\sqrt{d})/73 \ (T=\text{count of twist } (t/\text{in}), d=\text{fineness (den)})$$

is from zero to 0.5, and a multifilament sheath yarn wound around the periphery of the wadding, wherein the filaments constituting said multifilament sheath yarn form an angle of not more than 30° with a longitudinal axis of the fishing line.

2. The fishing line of claim 1, wherein the multifilament sheath yarn is finer than the wadding and is wound twice on the periphery of the wadding in opposite winding directions.

3. The fishing line of claim 2 wherein the multifilament sheath yarn is a yarn dyeable with conventional dyes.

4. The fishing line of claim 3, wherein the entirety of the wadding is composed of a high cord strength fiber having a strength at break of not less than 20 g/d, an elongation at break of not more than 6% and an initial modulus of not less than 600 g/d.

5. The fishing line of claim 4, wherein the entirety of the wadding is composed of a high cord strength fiber comprising filaments formed by drawing an ultra high molecular weight polyolefin having a weight-average molecular weight of not less than 1,000,000.

6. The fishing line of claim 1 or claim 2, wherein an outermost layer is coated with a resin.

7. The fishing line of claim 6, wherein the entirety of the wadding is composed of a high cord strength fiber having a strength at break of not less than 20 g/d, an elongation at break of not more than 6% and an initial modulus of not less than 600 g/d.

8. The fishing line of claim 7, wherein the entirety of the wadding is composed of a high cord strength fiber comprising filaments formed by drawing an ultra high molecular weight polyolefin having a weight-average molecular weight of not less than 1,000,000.

9. The fishing line of claim 6 wherein the multifilament sheath yarn is a yarn dyeable with conventional dyes.

10. The fishing line of claim 9, wherein the entirety of the wadding is composed of a high cord strength fiber having a strength at break of not less than 20 g/d, an elongation at break of not more than 6% and an initial modulus of not less than 600 g/d.

11. The fishing line of claim 10, wherein the entirety of the wadding is composed of a high cord strength fiber comprising filaments formed by drawing an ultra high molecular weight polyolefin having a weight-average molecular weight of not less than 1,000,000.

12. The fishing line of claim 1 or claim 2, wherein the wadding and the multifilament sheath yarn are heat-melt bonded.

13. The fishing line of claim 12 wherein the multifilament sheath yarn is a yarn dyeable with conventional dyes.

14. The fishing line of claim 13, wherein the entirety of the wadding is composed of a high cord strength fiber having a strength at break of not less than 20 g/d, an elongation at break of not more than 6% and an initial modulus of not less than 600 g/d.

15. The fishing line of claim 14, wherein the entirety of the wadding is composed of a high cord strength fiber comprising filaments formed by drawing an ultra high molecular weight polyolefin having a weight-average molecular weight of not less than 1,000,000.

16. The fishing line of claim 1 wherein the multifilament sheath yarn is a yarn dyeable with conventional dyes.

17. The fishing line of any one of claims 1, 2, or 16 wherein the entirety of the wadding is composed of a high cord strength fiber having a strength at break of not less than 20 g/d, an elongation at break of not more than 6% and an initial modulus of not less than 600 g/d.

18. The fishing line of claim 17, wherein the entirety of the wadding is composed of a high cord strength fiber comprising filaments formed by drawing an ultra high molecular weight polyolefin having a weight-average molecular weight of not less than 1,000,000.

19. The fishing line of claim 1, wherein said multifilament sheath yarn is twisted.

20. The fishing line of claim 1, wherein the angle of the filaments constituting said multifilament sheath yarn is not more than 10° with respect to said fishing line axis.

21. The fishing line of claim 20, wherein the angle of the filaments constituting said multifilament sheath yarn is not more than 8° with respect to said fishing line axis.

22. The fishing line of claim 21, wherein the angle of the filaments constituting said multifilament sheath yarn is not more than 5° with respect to said fishing line axis.

23. The fishing line of claim 22, wherein the angle of the filaments constituting said multifilament sheath yarn is not more than 3° with respect to said fishing line axis.

* * * * *